UNITED STATES PATENT OFFICE.

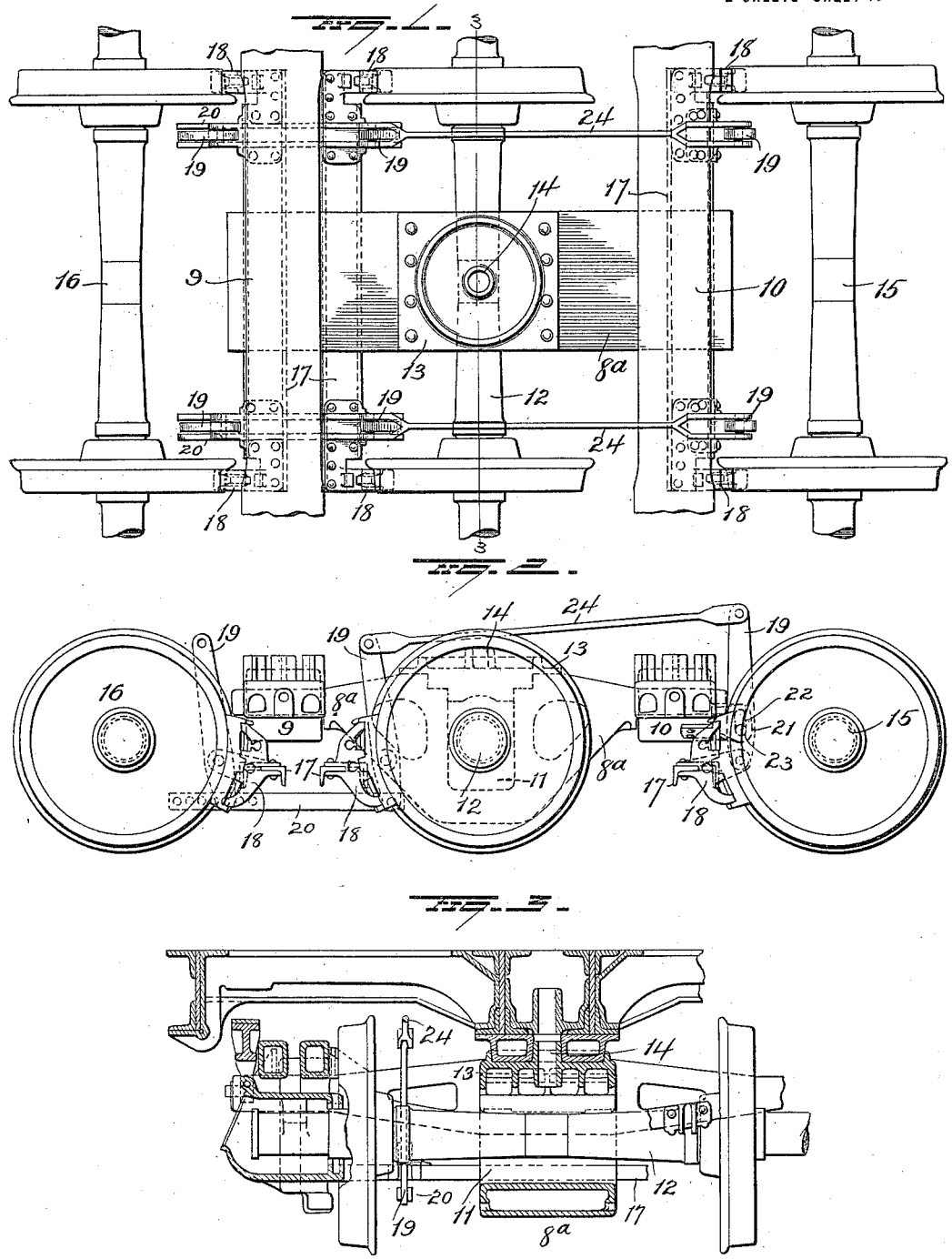

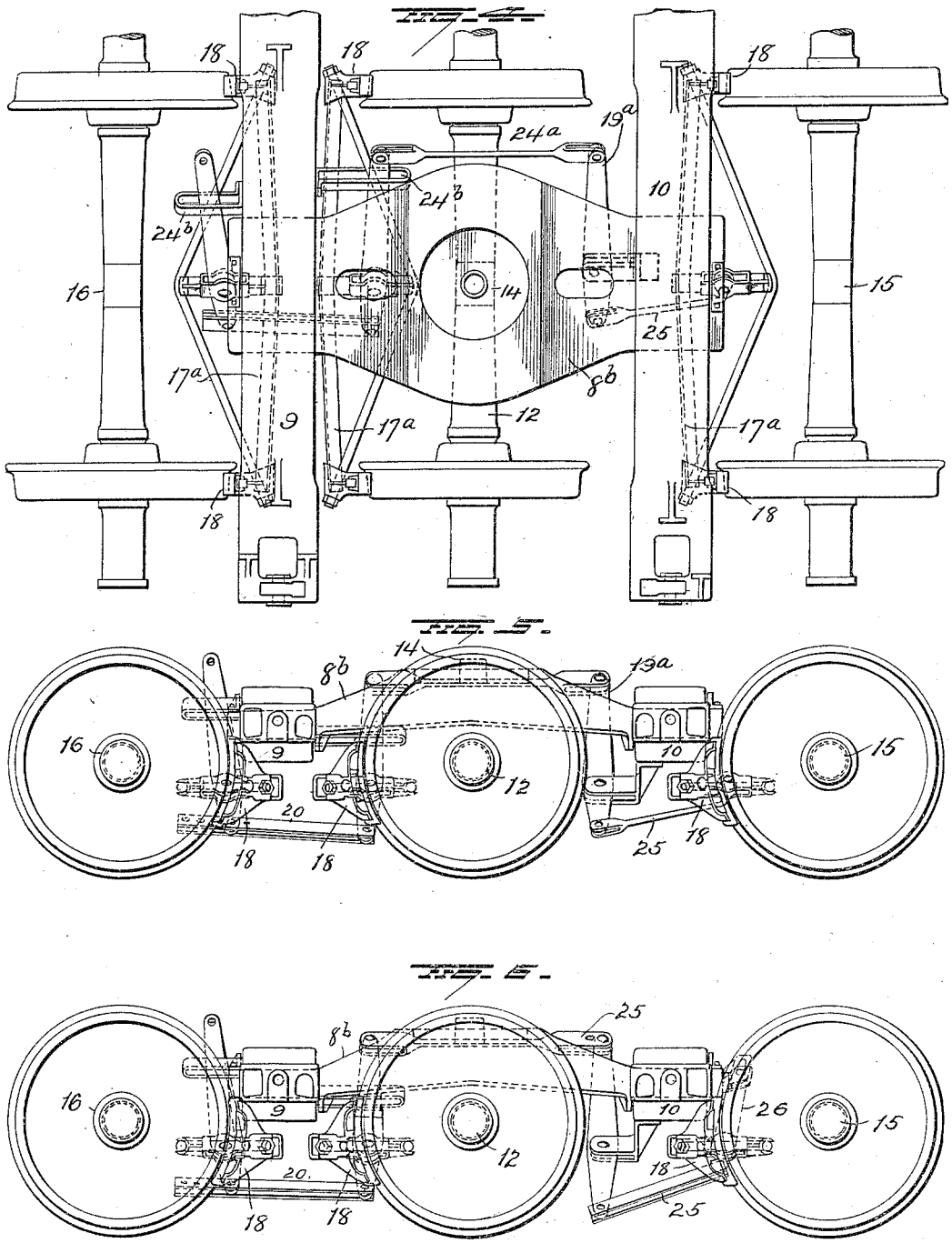

JOHN C. WHITRIDGE AND GEORGE T. JOHNSON, OF COLUMBUS, OHIO, ASSIGNORS TO THE BUCKEYE STEEL CASTINGS COMPANY, OF COLUMBUS, OHIO.

BRAKE ARRANGEMENT FOR SIX-WHEEL TRUCKS.

1,232,143. Specification of Letters Patent. Patented July 3, 1917.

Application filed April 21, 1916. Serial No. 92,639.

*To all whom it may concern:*

Be it known that we, JOHN C. WHITRIDGE and GEORGE T. JOHNSON, citizens of the United States, and residents of Columbus, in the county of Franklin and State of Ohio, have invented certain new and useful Improvements in Brake Arrangements for Six-Wheel Trucks; and we do hereby declare the following to be a full, clear, and exact description of the invention, such as will enable others skilled in the art to which it appertains to make and use the same.

Our invention relates to an improvement in brake arrangement for six wheel trucks and is adapted particularly for use with the truck shown in Patent No. 1,153,741 granted to us September 14th, 1915, the object being to provide a construction that will be comparatively simple and that will equalize the brake pressure on all the wheels at the same time.

Our invention consists in the parts and combinations of parts as will be more fully described and pointed out in the claims.

In the accompanying drawings, Figure 1 is a view in plan; Fig. 2 a view in side elevation and Fig. 3 a view in section on the line 3—3 of Fig. 1, of one form of brake mechanism; Figs. 4 and 5 are views in plan and side elevation of another form and Fig. 6 is a view in side elevation of another modification.

This improvement is designed particularly for six wheel trucks wherein a main bolster $8^a$ is supported at its ends on the auxiliary bolster 9 and 10, and in the preferred construction the main bolster resembles an ordinary cast steel truck side frame, and is provided with a central opening 11 for the free passage and movement of the middle axle 12 of the truck, the top of said opening being closed by the part 13 carrying the center bearing 14 which is removably secured in place so as to permit the axle 12 to be placed in position and removed when necessary as fully explained in the patent above referred to.

The main bolster $8^a$ extends lengthwise of the truck and is mounted at its ends on seats formed in or on the auxiliary bolsters 9 and 10. These latter bolsters extend transversely of the truck, one being located in a plane between the axle 15 and the middle axle 12, and the other between the middle axle 12 and the axle 16, and each is preferably provided with an opening located centrally with relation to its ends for the reception of the ends of the main bolster $8^a$.

The brake beams 17 are hung from the truck side frames and the brake shoes 18 are keyed to the brake beams in the usual manner.

Each brake beam 17 is actuated by a pair of levers 19, which are connected to their respective beams, and which project approximately vertically to points above the top of the bolster so that all connections between the levers and the chains or rods from the brake actuating mechanism will be at opposite sides of the main bolster and in a plane above the auxiliary bolsters so that all of said parts will be readily accessible and be clear of all parts of the truck. The four levers 19 at opposite sides of auxiliary bolster 9 are arranged in pairs as shown in Fig. 1, and each pair is connected at their lower ends by the compression member 20, and at points intermediate their ends to the brake beams 17.

The levers 19, at the outer side of auxiliary bolster 10, are loosely mounted for pivotal and vertical movement in the brackets 21 secured to bolster 10, the said brackets having elongated slots 22 in which pivot pins 23 of the levers 19 rest and move. Brake beam 17 is secured to the lower ends of said levers, and the upper ends of the latter are connected by the tension members 24 with the intermediate floating levers 19.

With this construction it will be seen that when a pulling stress is exerted on the upper ends of the two levers at the outer side of bolster 9, the brake shoes of all three brake beams will be forced into contact with their respective wheels, and as the entire equipment is flexible, the brake pressure on all the wheels will be the same, by properly proportioning the various levers.

In the construction above described and illustrated in Figs. 1, 2 and 3, the levers, tension members and compression members are located at opposite sides of the main bolster and adjacent the wheels.

In the construction shown in Figs. 4 and 5 we have shown a single floating lever $19^a$ connected to the longitudinal center of brake beam $17^a$ and disposed diagonally so that its upper end is above and to one side of the main bolster $8^b$ which in this instance is shown wider at its center than the main bolster in Fig. 1. We have shown looped guides 24<sup>b</sup> for guiding and steadying the floating levers, and the tension member 24<sup>a</sup> is at one side of the main bolster 8<sup>b</sup>.

We have located the first lever 19<sup>a</sup> intermediate the auxiliary bolster 10 and the middle axle 12 instead of between bolster 10 and axle 15 as in Fig. 2, and have connected the lower end of said lever to the brake beam by the compression member 25.

In the construction shown in Fig. 6, the compression member 25 is connected to the lever 26, instead of to the brake beam as in Fig. 5. In other respects it is substantially identical with the latter. While we do not illustrate the use of double levers with the brake arrangements shown in Figs. 4, 5 and 6, it is evident that said construction would apply equally as well and might be resorted to in cases where like in Fig. 1 the design of the truck will not permit the use of single central levers.

In each of the above forms the brake mechanism is wholly outside of the main and auxiliary bolsters, that is, is not enveloped by any of the bolsters, and is consequently readily accessible for repairs or readjustment, and with the arrangements shown it is possible by properly proportioning the levers to equalize the brake pressure or get the same brake pressure on all the wheels at the same time.

It is evident that many slight changes might be resorted to in the relative arrangement of parts shown and described without departing from the spirit and scope of our invention. Hence we would have it understood that we do not wish to confine ourselves to the exact construction and arrangement of parts shown and described, but Having fully described our invention what we claim as new and desire to secure by Letters-Patent, is:—

1. In a brake rigging for six wheel trucks, the combination of a main and auxiliary bolsters, a plurality of levers disposed on opposite sides of the central axle of the truck, two of said levers at one side of said central axle being connected at their lower ends by a compression member, and one of said latter levers and a lever at the opposite side of said central axle being connected at their upper ends by a tension member, the latter being located outside of and to one side of the main bolster.

2. In a brake rigging for six wheel trucks, the combination of a main bolster, auxiliary bolsters supporting the main bolster, levers disposed at the outer sides of the auxiliary bolsters, a lever located intermediate one auxiliary bolster and the central axle, a compression member connecting the lower end of said latter lever with the lever at the other side of the same auxiliary bolster, and a tension member connecting said intermediate lever and a third lever, the said tension member being in a plane to one side of the main bolster.

3. In a brake rigging for six wheel trucks, the combination of a main and auxiliary bolsters, the latter supporting the main bolster, levers located intermediate the end axles and auxiliary bolsters, a lever located intermediate the central axle and one of the auxiliary bolsters, a compression member connecting the lower end of said intermediate lever and the lower end of the lever at the other side of the adjacent auxiliary bolster, and a tension member for applying power to the third lever, the said tension member being disposed at one side of the main bolster.

4. In a brake rigging for six wheel trucks, the combination of a main bolster and auxiliary bolsters supporting the main bolster, a pair of vertically disposed levers, one on each side of the main bolster, each lever having a pivot between its extremities, a brake beam connected to the lower ends of said levers, tension members connecting the upper ends of said levers with the upper ends of a second pair of vertical levers, a second brake beam connected to the latter levers at fulcrum points between the extremities of same, compression members connecting the lower ends of said levers with the lower ends of a third pair of vertical levers, a third brake beam connected to the third pair of levers at fulcrum points between the extremities of same and means for actuating the upper ends of said brake levers from the brake mechanism of the car body.

In testimony whereof we have signed this specification in the presence of two subscribing witnesses.

JOHN C. WHITRIDGE.
GEORGE T. JOHNSON.

Witnesses:
GEORGE MATTHEW MURPHY,
GEORGE FIESER KRAUSS.

Copies of this patent may be obtained for five cents each, by addressing the "Commissioner of Patents, Washington, D. C."